United States Patent [19]
Goto

[11] Patent Number: 6,037,941
[45] Date of Patent: *Mar. 14, 2000

[54] TAG DISPLAY CONTROL SYSTEM AND METHOD

[75] Inventor: Tomoyuki Goto, Kanagawa, Japan

[73] Assignee: Fuji Xerox Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/634,840

[22] Filed: Apr. 19, 1996

[30] Foreign Application Priority Data

Apr. 20, 1995  [JP]  Japan  .................................... 7-117734

[51] Int. Cl.⁷ ...................................................... G06F 3/00
[52] U.S. Cl. ........................................... 345/350; 345/345
[58] Field of Search ..................................... 345/345, 350, 345/344

[56] References Cited

U.S. PATENT DOCUMENTS

| | | | |
|---|---|---|---|
| 5,283,864 | 2/1994 | Knowlton | 345/350 |
| 5,412,775 | 5/1995 | Maeda et al. | 345/345 |
| 5,590,259 | 12/1996 | Anderson et al. | 345/345 |
| 5,668,964 | 9/1997 | Helsel et al. | 345/350 |

FOREIGN PATENT DOCUMENTS 5-40594  2/1993  Japan .

OTHER PUBLICATIONS

Hidekazu Tanikawa et al., Information Processing Society, 38th National Conference Lecture Paper Collection (II), pp. 1096–1097, Actipedia–electronic book (ACTEK), 1989.

*Primary Examiner*—Mark R. Powell
*Assistant Examiner*—Huedung X. Cao
*Attorney, Agent, or Firm*—Finnegan, Henderson, Farabow, Garrett & Dunner, L.L.P.

[57] ABSTRACT

A tag display control system displays document pages to which tags are attached in offset overlapped relation. In the system, page size information, and attachment position information and size information of each of tags attached to each page are stored in a display data table, and a tag control section determines overlap of a tag to a lower page with respect to an upper page or a tag to an upper page based on the page overlap order information, the page size information, and the attachment position information and size information of the tags. If the lower page tag is hidden under the upper page or upper page tag, the tag control section changes the attachment position information or size information of the lower page tag or reduces the size of the upper page tag for changing the attachment position or size so as to display the lower page tag on an output section.

14 Claims, 21 Drawing Sheets

| TOTAL NUMBER OF PAGES, N | ⎫ 6 |

| SIZE OF FIRST PAGE |

| SIZE OF SECOND PAGE |

| ⋮ |

| SIZE OF N-TH PAGE |

| CONTENTS OF FIRST PAGE |

| CONTENTS OF SECOND PAGE |

| ⋮ |

| CONTENTS OF N-TH PAGE |

*FIG. 3*

| |
|---|
| NUMBER OF TAGS ATTACHED TO FIRST PAGE, F1 |
| POSITION OF FIRST TAG ATTACHED TO FIRST PAGE |
| SIZE OF FIRST TAG ATTACHED TO FIRST PAGE |
| ⋮ |
| POSITION OF F1-TH TAG ATTACHED TO FIRST PAGE |
| SIZE OF F1-TH TAG ATTACHED TO FIRST PAGE |
| NUMBER OF TAGS ATTACHED TO N-TH PAGE, FN |
| POSITION OF FIRST TAG ATTACHED TO N-TH PAGE |
| SIZE OF FIRST TAG ATTACHED TO N-TH PAGE |
| ⋮ |
| POSITION OF FN-TH TAG ATTACHED TO N-TH PAGE |
| SIZE OF FN-TH TAG ATTACHED TO N-TH PAGE |

*FIG. 4*

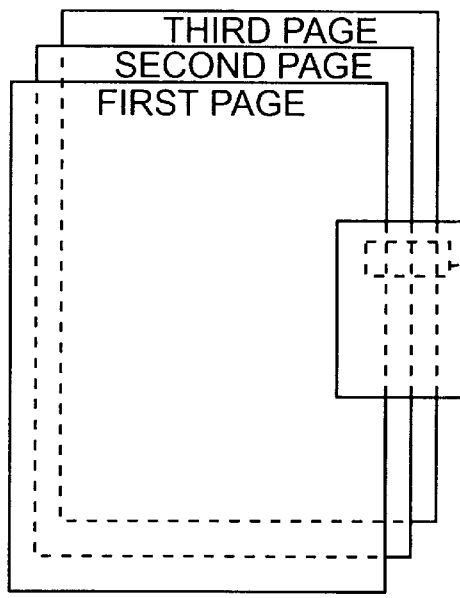
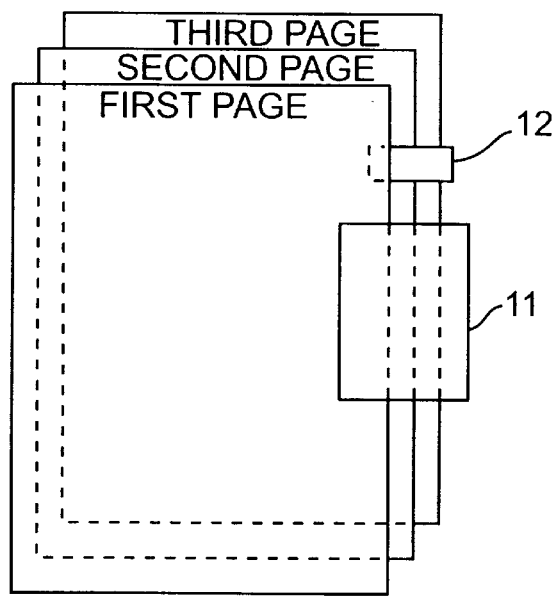
FIG. 14A          FIG. 14B
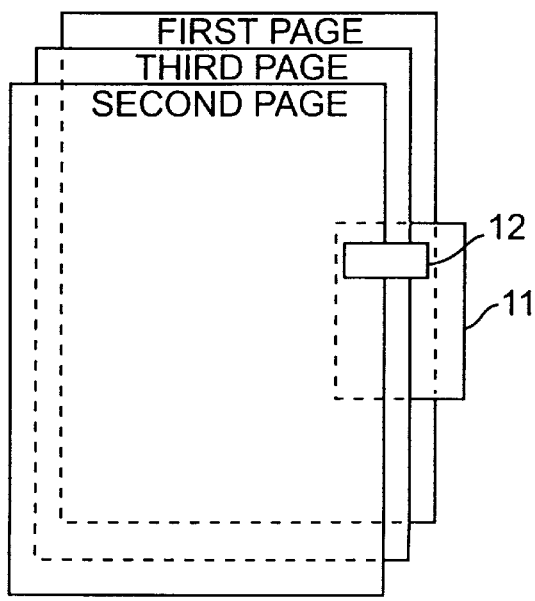
FIG. 14C

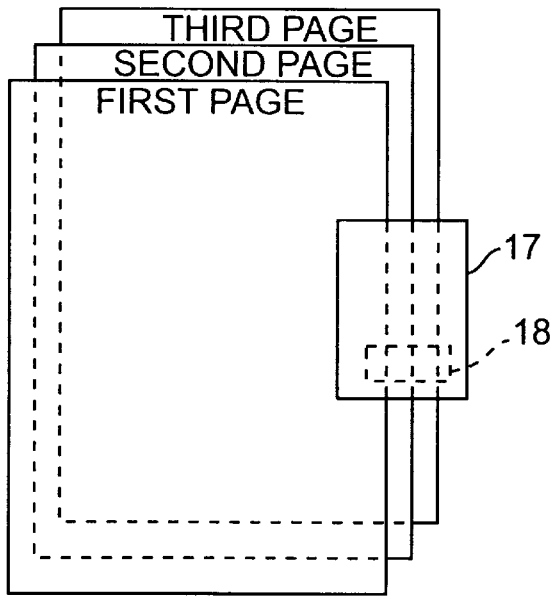
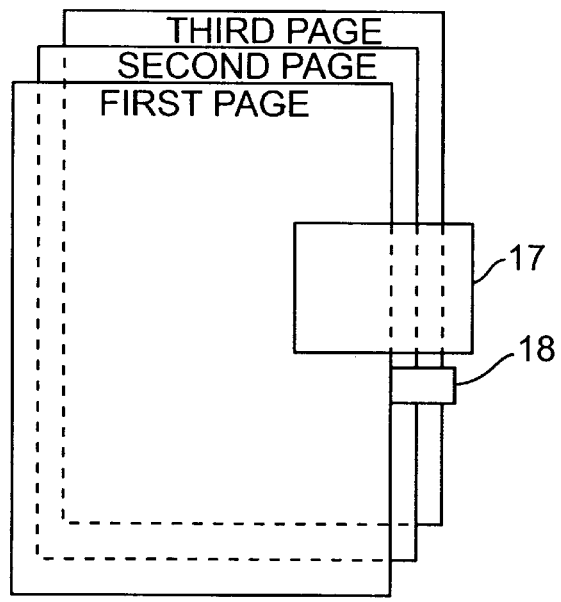
*FIG. 21A*    *FIG. 21B*
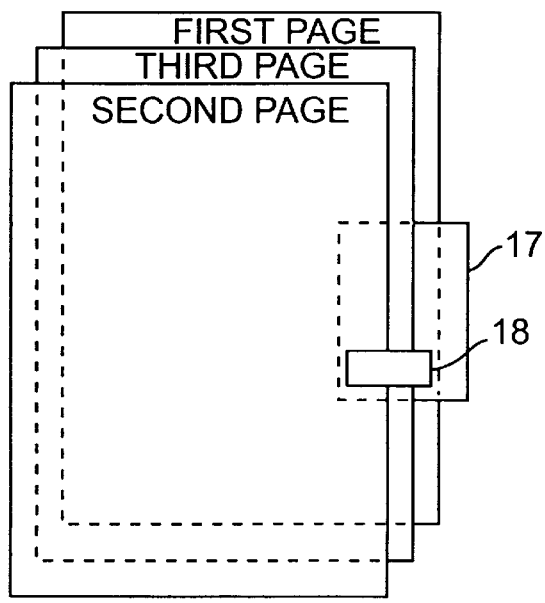
*FIG. 21C*

TAG DISPLAY CONTROL SYSTEM AND METHOD

BACKGROUND OF THE INVENTION

1. Field of the Invention

This invention relates to a document processing system which displays pages of a document in overlapped relation and in particular to a tag display control system which avoids overlap display of tags attached to a document.

2. Description of the Related Art

Hitherto, in a document processing system which displays documents as multiwindows on a display screen and processes the documents in page units, an art for attaching tags to document pages to enable easy retrieval of any desired page has been proposed (Information Processing Society, 38th National Conference Lecture Paper Collection (II), p1096–p1097, "Actipedia-electronic book (ACTEK)", Hidekazu TANIKAWA, el at.).

In a document processing system capable of multiwindow display, an art has been proposed in Japanese Patent Unexamined Publication No. Hei. 5-40594, wherein in addition to attaching tags to document pages, a tag window is linked with a document page and can be extended off the document page for attachment thereto and even if document pages are displayed in overlapped relation, the tag extension is displayed.

According to the proposed art, if document pages are displayed in overlapped relation in a bundle, any document page can also be easily retrieved with the tag displayed extending off the document pages.

However, if tags are extended off document pages for attachment thereto as described above, when document pages are displayed in overlapped relation, the tag attached to a lower page may be hidden under the tag attached to an upper page. In such a case, the tag to the lower page is not displayed and the page cannot be retrieved.

To display document pages in offset overlapped relation for representing thickness of a bundle of the pages, the tag to a lower page may be hidden under an upper document page itself, causing a problem as described above. Such a situation also occurs when portrait and landscape document pages are mixed for display in overlapped relation; the tag to a lower page is hidden under an upper document page itself depending on how the document pages are overlapped.

SUMMARY OF THE INVENTION

It is therefore an object of the invention to provide a tag display control system which always displays tags if pages are displayed in overlapped relation.

It is another object of the invention to provide a tag display control system which always displays lower page tags by automatically changing the positions or sizes of tags when pages of documents displayed in overlapped relation are turned.

To these ends, according to a first aspect of the invention, there is provided a tag display control system which displays document pages to which tags are attached in overlapped relation, the system comprisings storage means for storing page overlap order information and attachment position information and size information of each tag attached to each page; determination means for determining overlap of a tag to a lower page with respect to a tag to an upper page based on the page overlap order information and the attachment position information and size information of the tags; change means for changing the attachment position information based on a determination result and rewriting new attachment position information into the storage means; and output means for displaying the document and tags based on the new storage contents of the storage means.

According to a second aspect of the invention, there is provided a tag display control system which displays document pages to which tags are attached in overlapped relation, the system comprisings storage means for storing page overlap order information and attachment position information and size information of each tag attached to each page; determination means for determining overlap of a tag to a lower page with respect to a tag to an upper page based on the page overlap order information and the attachment position information and size information of the tags; change means for changing the size information based on a determination result and rewriting new size information into the storage means; and output means for displaying the document and tags based on the new storage contents of the storage means.

According to a third aspect of the invention, there is provided a tag display control system which displays document pages to which tags are attached in offset overlapped relation, the system comprisings storage means for storing page overlap order information, page size information, and attachment position information and size information of each tag attached to each page; determination means for determining overlap of a tag to a lower page with respect to an upper page based on the page overlap order information, the page size information, and the attachment position information and size information of each tag; change means for changing the attachment position information of the tag to the lower page based on a determination result and rewriting new attachment position information into the storage means; and output means for displaying the document and tags based on the new storage contents of the storage means.

According to a fourth aspect of the invention, there is provided a tag display control system which displays document pages to which tags are attached in offset overlapped relation, the system comprisings storage means for storing page overlap order information, page size information, and attachment position information and size information of each tag attached to each page; determination means for determining overlap of a tag to a lower page with respect to an upper page based on the page overlap order information, the page size information, and the attachment position information and size information of each tag; change means for changing the size information of the tag to the lower page based on a determination result and rewriting new size information into the storage means; and output means for displaying the document and tags based on the new storage contents of the storage means.

BRIEF DESCRIPTION OF THE DRAWINGS

In the accompanying drawings:

FIG. 3 is a conceptual diagram explaining the storage contents of a page data table;

FIG. 4 is a conceptual diagram explaining the storage contents of a tag data table;

FIGS. 14 (a) to 14 (c) are conceptual diagrams explaining the function when a tag attachment position is changed upward;

FIGS. 21 (a) to 21 (c) are conceptual diagrams explaining the function when the tag size is changed according to a third embodiment of the invention.

DETAILED DESCRIPTION OF THE PREFERRED EMBODIMENTS

Referring now to the accompanying drawings, there are shown preferred embodiments of the invention.

First, a tag display control system according to a first embodiment of the invention will be discussed.

Figure 1:
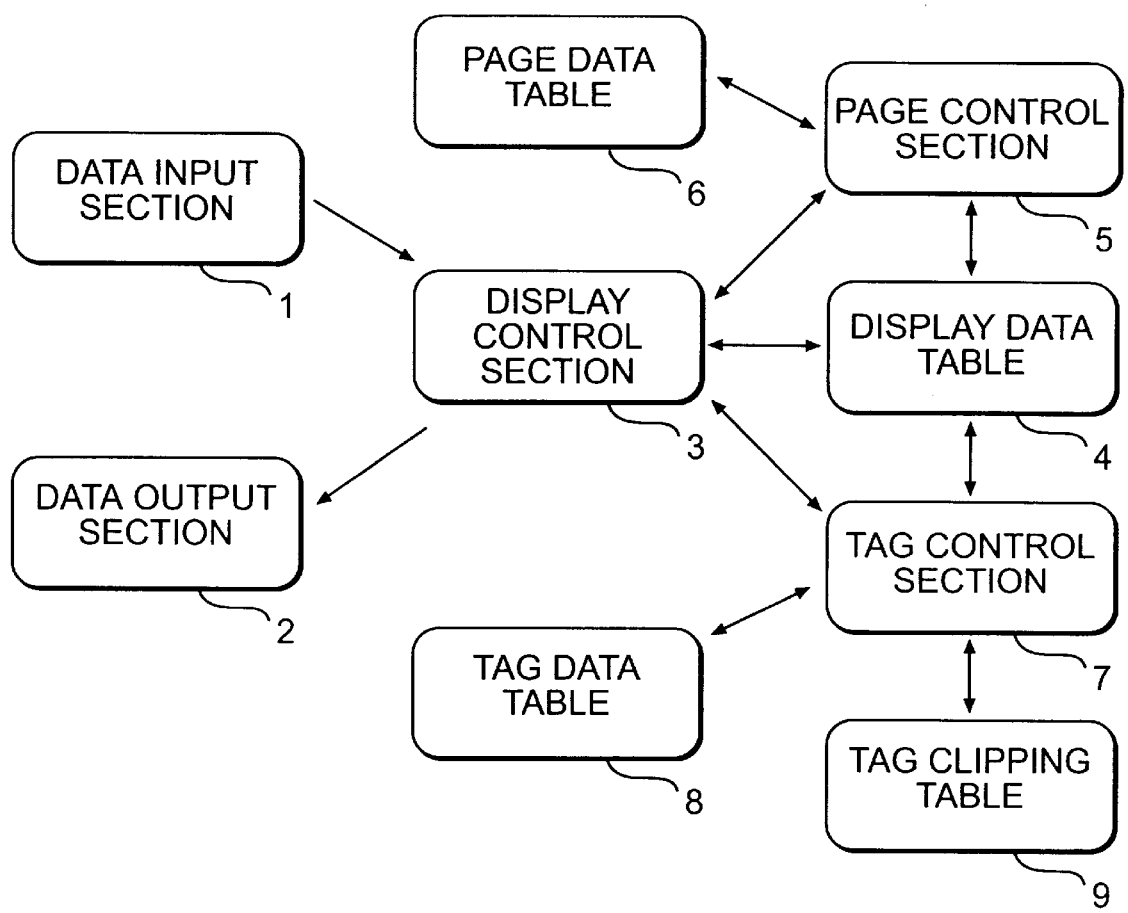
FIG. 1 is a block diagram showing the configuration of a tag display control system according to a first embodiment of the invention.

As shown in FIG. 1, the tag display control system comprises a data input section 1, a data output section 2, a display control section 3, a display data table 4, a page control section 5, a page data table 6, a tag control section 7, a tag data table 8, and a tag clipping table 9. It also comprises a multiwindow control section, etc., for displaying document pages in overlapped relation and attaching tags to the pages for display, but the techniques are known and therefore multiwindow display control will not be discussed hereinafter.

The data input section 1 includes data input devices such as a mouse and a keyboard and an interface device, and the user enters data and instructions through the data input section 1.

The data output section 2 includes a display, a printer, etc., and a bundle of document pages to which tags are attached is displayed on a screen of the display, as described below.

The display control section 3 causes the page control section 5 and the tag control section 7 to perform predetermined processing based on an input through the data input section 1 for reading data of a document page bundle to which configured tags are attached from the display data table 4 and displaying the corresponding image on the data output section 2.

Figure 2:
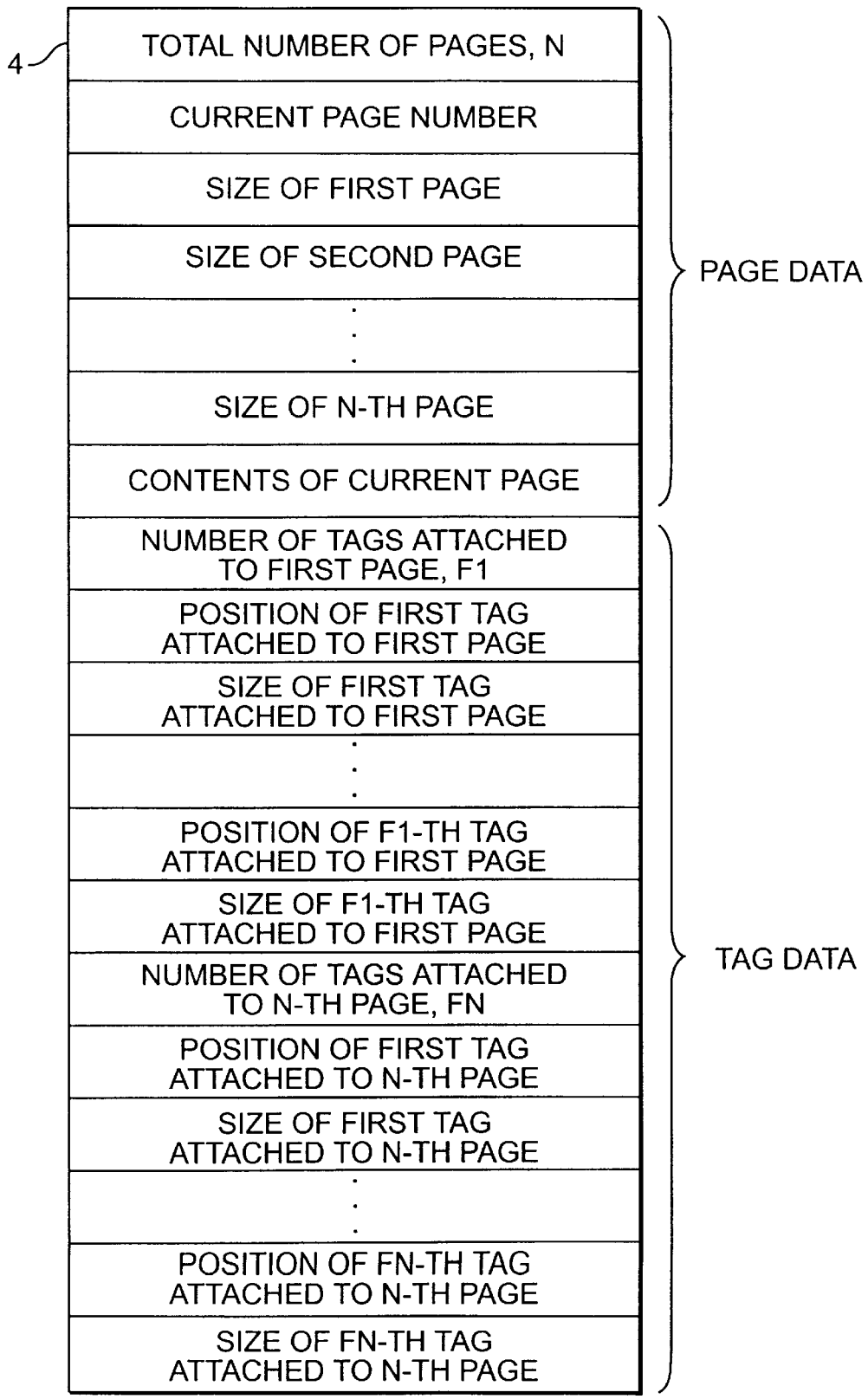
FIG. 2 is a conceptual diagram explaining the storage contents of a display data table.

The display data table 4 is made of a readable/writable memory for storing data concerning document pages and data concerning tags corresponding to each page, as shown in FIG. 2.

That is, stored as the data concerning pages are the total number of document pages displayed in overlapped relation (N), the page number of the current uppermost page (current page), the size of each page of a document page bundle on the display screen, and description content data of the current page. Data for each document page is stored as the data concerning tags; the number of tags attached to each page, the attachment position of each tag on the display screen, and the size of each tag on the display screen are stored.

In the embodiment, the document page data and the tag data are stored in the display data table 4 as image data displayed on the display screen.

The display data table 4 functions as storage means.

The page control section 5 reads data of the document page to be displayed from the page data table 6 based on a command from the display control section 3 and writes the read data into a predetermined address of the display data table 4.

The page data table 6, which is made of at least a readable memory, stores the total number of document pages displayed in overlapped relation (N), the size of each page, and description content data of each page (data of text, control characters, etc.,) as the data concerning document pages, as shown in FIG. 3.

The tag control section 7 reads data concerning the tag to be displayed from the tag data table 8 based on a command from the display control section 3 and further performs display processing concerning the tag with reference to the tag clipping table 9 as required, then writes the data concerning the tag into a predetermined address of the display data table 4.

The tag data table 8, which is made of at least a readable memory, stores data about the number of tags attached to each document page, the attachment position of each tag, and the size of each tag as the data concerning tags, as shown in FIG. 4.

Figure 5:
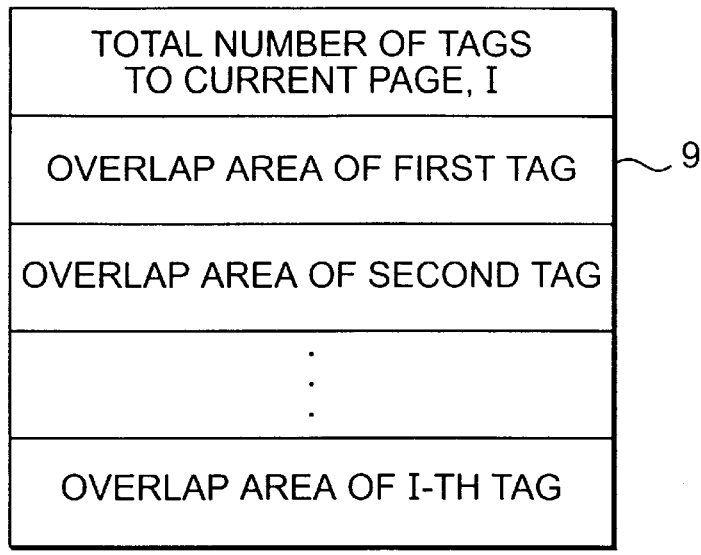
FIG. 5 is a conceptual diagram explaining the storage contents of a tag clipping table.

The tag clipping table 9, which is made of a readable/writable memory, stores overlap area data for each tag attached to the current page (current uppermost page), as shown in FIG. 5. The overlap area data is calculated by the tag control section 7 and is data of areas where the tags attached to the current page have the potential for covering tags attached to lower pages.

The tag control section 7 functions as determination means for determining tag overlap and change means for rewriting information on tags.

Processing of the tag display control system having the above configuration will be discussed with reference to flowcharts shown in FIGS. 6 to 13. At a point in time when the following processing is started, data concerning pages and data concerning the tags corresponding thereto are stored in the display data table 4 and a bundle of the document pages to which the tags are attached is displayed on the display screen of the data output section 2 in accordance with the data.

Figure 6:
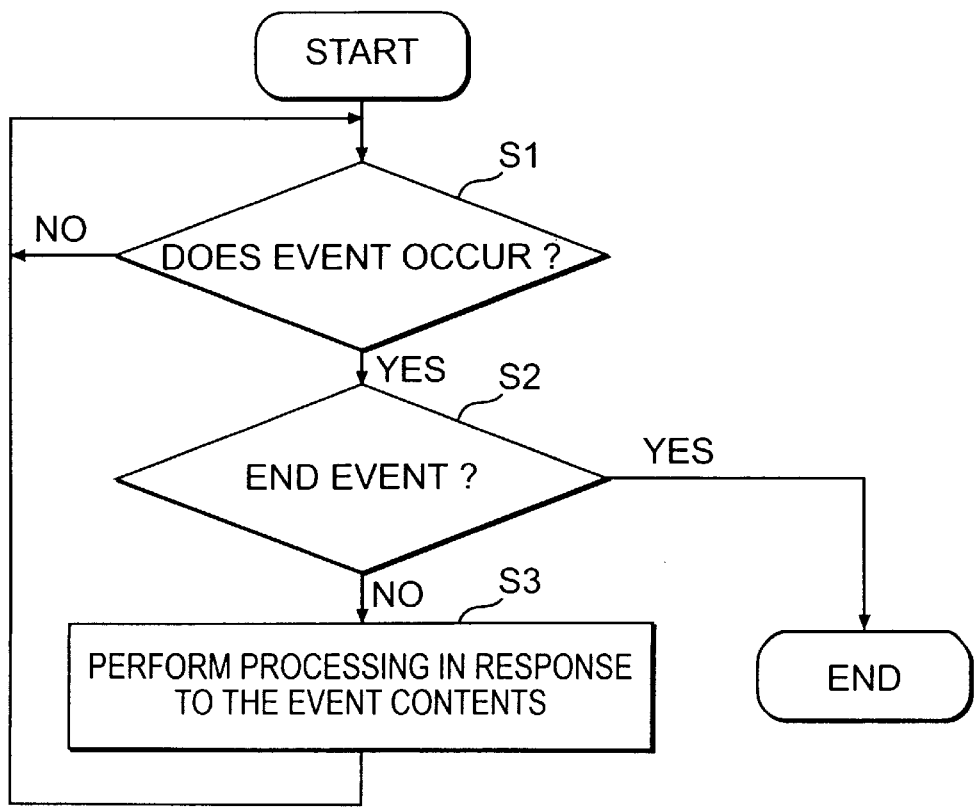
FIG. 6 is a flowchart showing a main process procedure of the tag display control system.

When the tag display control system is started in this state, as shown in FIG. 6, the display control section 3 always monitors an input (event) entered through the data input section 1 at step S1 and if the input through the data input section 1 is an end instruction event, terminates the process at step S2; if the input is some process event, the display control section 3 performs processing in response to the event at step S3.

Figure 7:
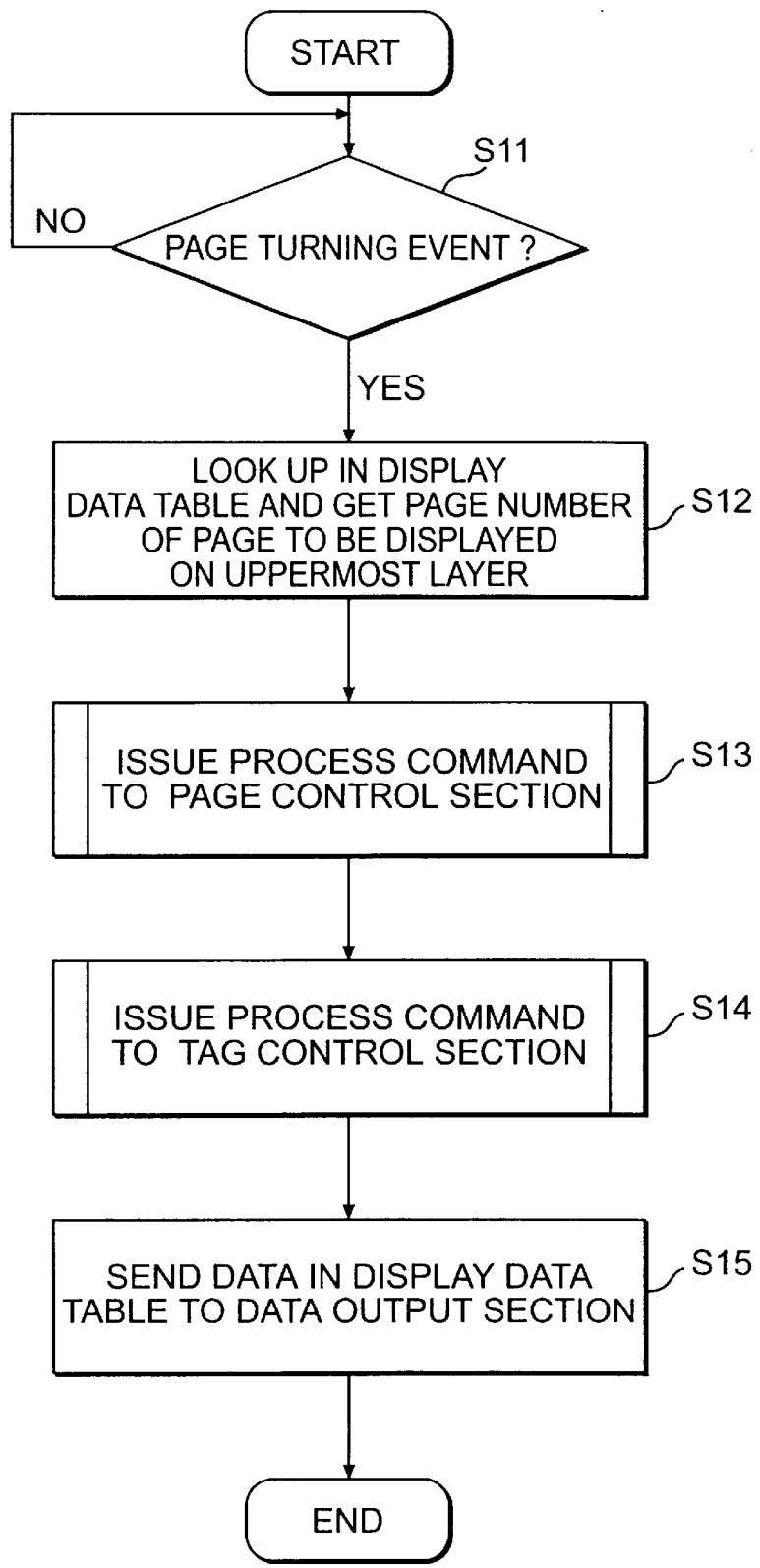
FIG. 7 is a flowchart showing a processing procedure of a display control section.

As shown in FIG. 7, if the input event is a page turning event for turning a bundle of document pages at step S11, the display control section 3 retrieves the page number of the page to be displayed on the uppermost layer from the display data table 4 based on the instruction through the data input section 1 at step S12.

The page turning instruction is given by clicking on a tag attached to a lower page through the mouse or entering a specified page through the keyboard. For the clicking, the display control section 3 determines which tag the user clicks on from the screen position on which the user clicks and information of the positions and sizes of tags stored in the display data table 4, and determines the page number by assuming that the page to which the tag is attached is to be displayed as the uppermost page.

The display control section 3 transmits a page turning command based on the page number of the page to be displayed on the uppermost layer to the page control section 5 for commanding the page control section 5 to turn pages so as to display the indicated page as the uppermost layer and change the page data portion stored in the display data table 4 at step S13.

After receiving a notice of the process end from the page control section 5, the display control section 3 transmits a page turning command based on the page number of the page to be displayed on the uppermost layer to the tag control section 7 for commanding the tag control section 7 to perform a change process concerning the tag display form associated with the page turning and change the tag data portion stored in the display data table 4 at step S14.

After receiving a notice of the process end from the tag control section 7, the display control section 3 reads the changed data from the display data table 4 and displays an image resulting from the page turning on the display screen of the data output section 2 based on the new data at step S15. The image displayed on the display screen is a bundle of document pages with the page specified through the data input section 1 displayed as the uppermost layer and at least a part of each tag attached thereto is displayed by executing step S14.

Figure 8:
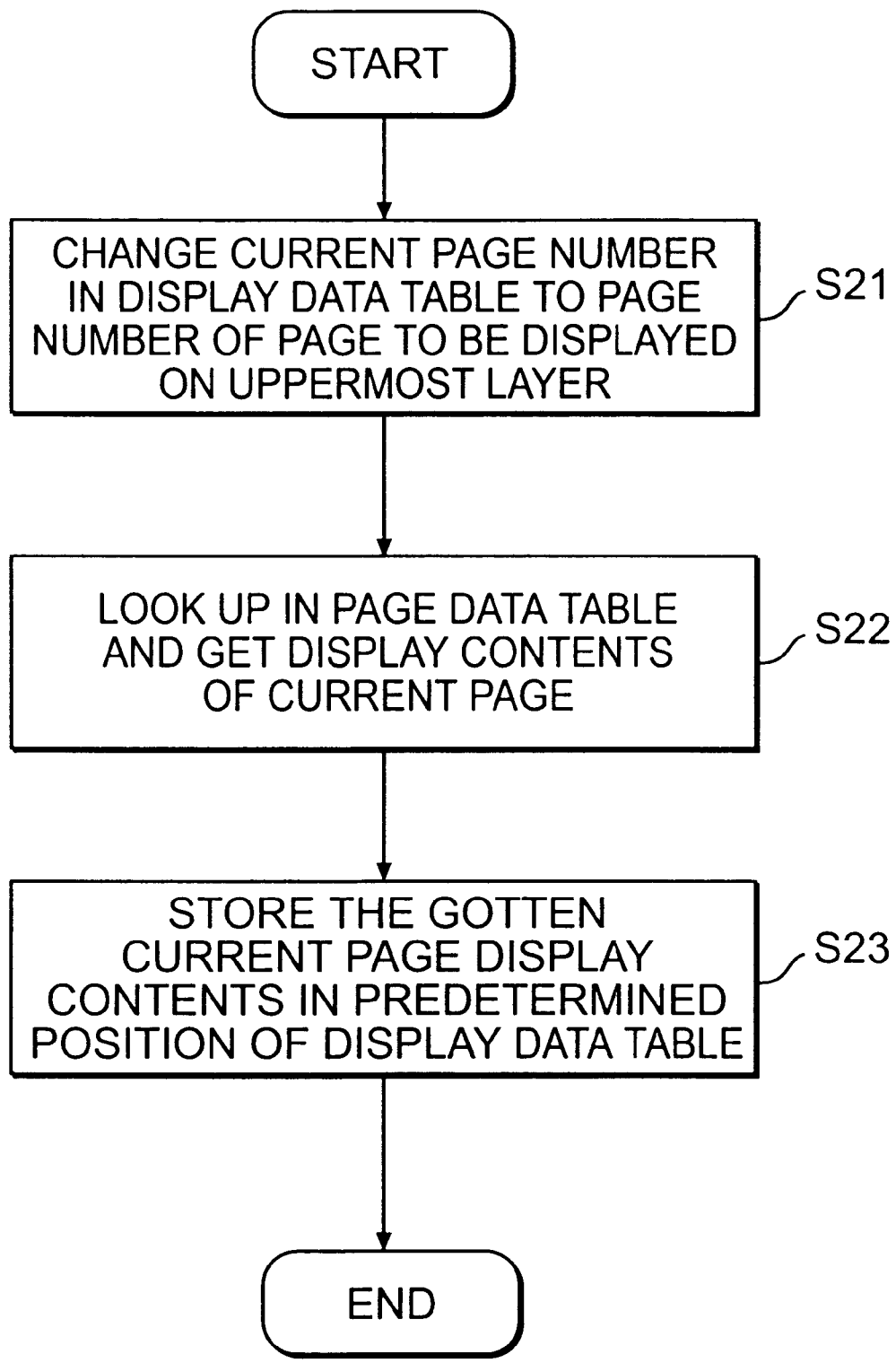
FIG. 8 is a flowchart showing a processing procedure of a page control section.

The process of step S13 described above is executed by the page control section 5 according to a procedure shown in FIG. 8.

The page control section 5 changes the current page number in the display data table 4 to the specified page number of the page to be displayed on the uppermost layer at step S21 based on the command from the display control section 3, reads the description content data of the page as the new current page from the page data table 6 at step S22, and rewrites the read description content data into the entry of "contents of current page" in the display data table 4 at step S23.

Therefore, the document page bundle resulting from page turning in compliance with the instruction is displayed on the display screen in response to the new page data portion of the display data table 4.

The process of step S14 is executed by the tag control section 7 according to procedures shown in FIGS. 9 to 13.

In the embodiment tag display control processing is performed for each page in order from the uppermost page to lower pages of a bundle of document pages displayed in overlapped relation. After the total number of pages and the page number and size of the new current page are obtained from the display data table 4 at step S31, whether or not tag display control processing for all pages is completed is determined based on the total number of pages at step S32.

If processing for all pages is completed, an end notification is sent to the display control section 3 and the process is terminated; if an unprocessed page remains, step S33 and the subsequent steps are repeated for each page.

In the process for each page, the tags attached to the page being processed are processed one by one and display control processing for all tags attached to the page is completed, then the next page is processed at step S33.

In display control processing for one tag attached to one page, first the position and size of the tag being processed are obtained from the tag data table 8 at step S34 and the overlap area of the tag is calculated from the data as described later and is held in the tag clipping table 9 at step S35. For the tags attached to the uppermost page, the data stored in the tag data table 8 is held in the tag clipping table 9 as it is.

Next, the overlap area data of the tag being processed is compared with the overlap area data of a different tag previously held in the tag clipping table 9, namely, an upper tag and if the tag being processed is completely hidden under the different tag, the attachment position data of the tag is gradually changed to adjust the tag position so that at least a part of the tag extends off the upper page tag at steps S36 and S37. The position adjustment is executed by rewriting the tag attachment position data by a preset amount at a time in a preset direction and is completed when a part of the tag being processed extends off the upper page tag from the rewritten attachment position data and the tag size data and the overlap area data of the upper page tag.

Next, the new attachment position data of the tag thus processed is rewritten into the corresponding entry of the display data table 4; the tag data stored in the display data table 4 is subjected to attachment position adjustment by the display control processing at step S38.

Therefore, the tag display control processing as described above is repeated, whereby the positions of the tag data stored in the display data table 4 are adjusted so as to extend off the upper tags.

Figure 10:
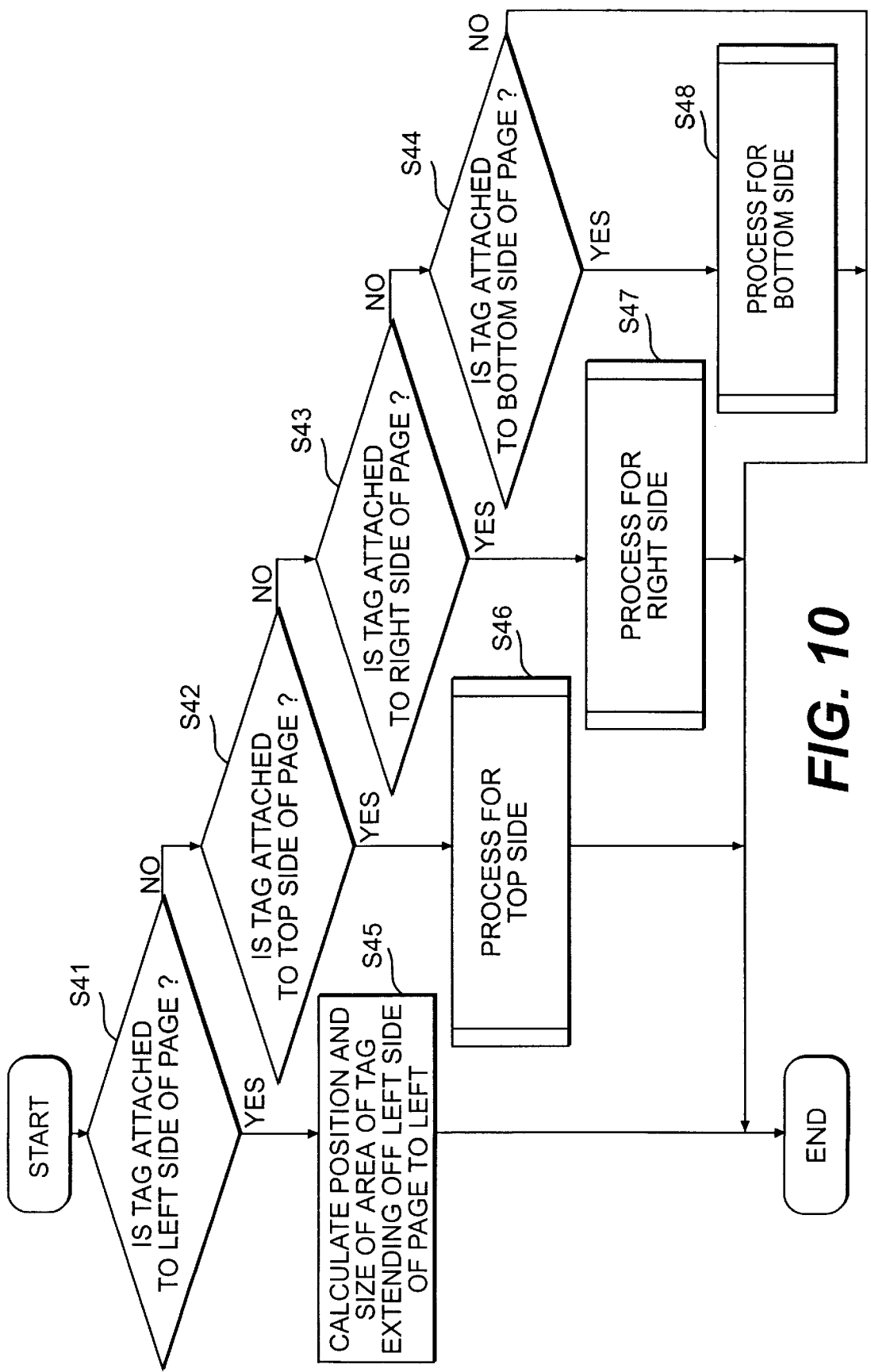
FIG. 10 is a flowchart showing a processing procedure for calculating an overlap area.

The overlap area data calculation process of step S35 described above is executed depending on which side of a document page the tag is attached to. That is, as shown in FIG. 10, the size of the page being processed is obtained from the display data table 4 and the attachment position and size of the tag being processed are obtained from the tag data table 8, then which side of the page the tag is attached to is determined at steps S41–S44.

The reason why processing is performed in response to the page side to which the tag is attached is that the case where document pages having different sizes are mixed is also handled.

If the tag is attached to the left side of the page, the position and size of the area of the tag extending off the left side of the page are calculated for use as the overlap area data of the tag at step S45.

Figure 11:
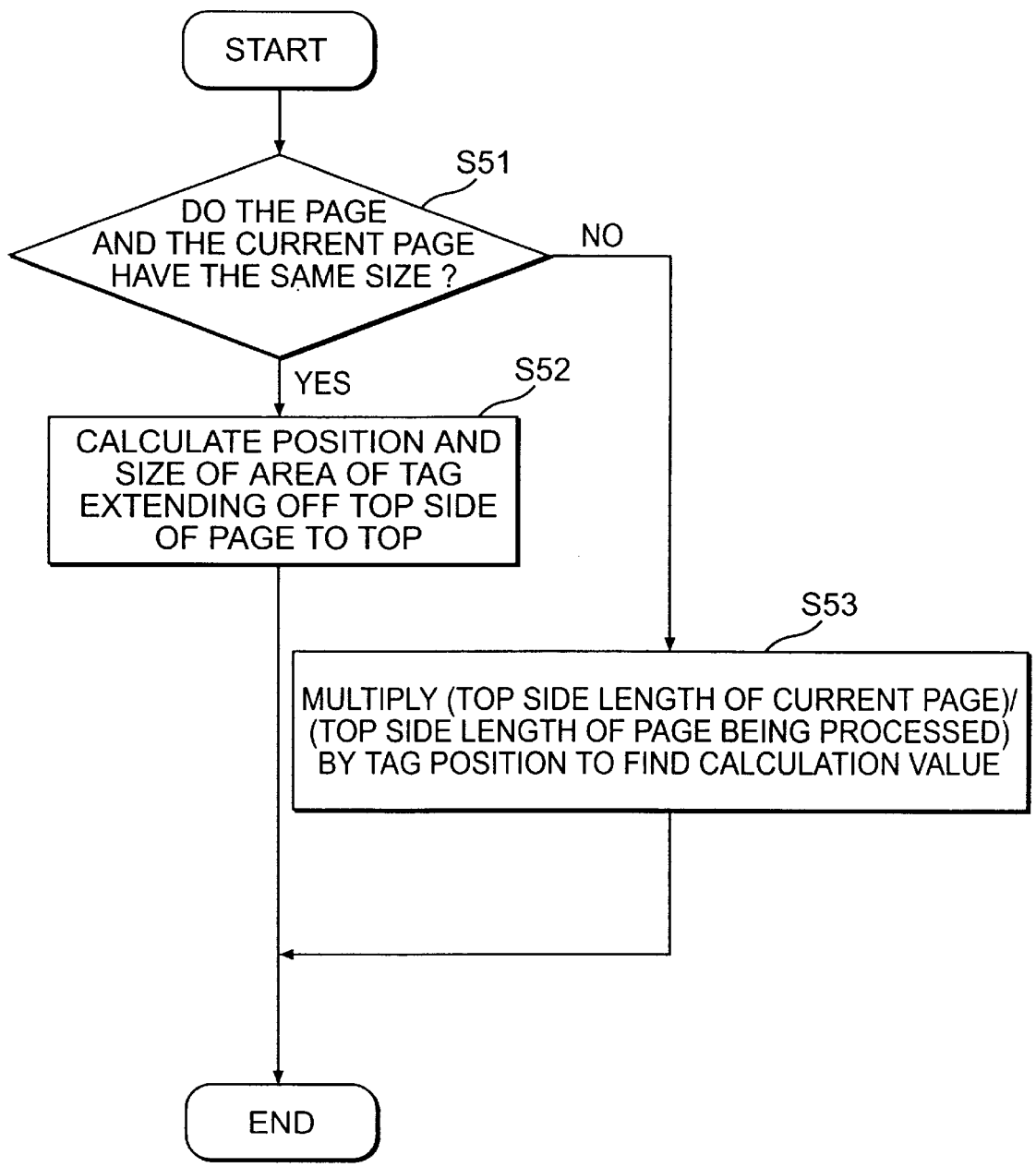
FIG. 11 is a flowchart showing a calculation processing procedure for a tag attached to the top side of a page.
Figure 12:
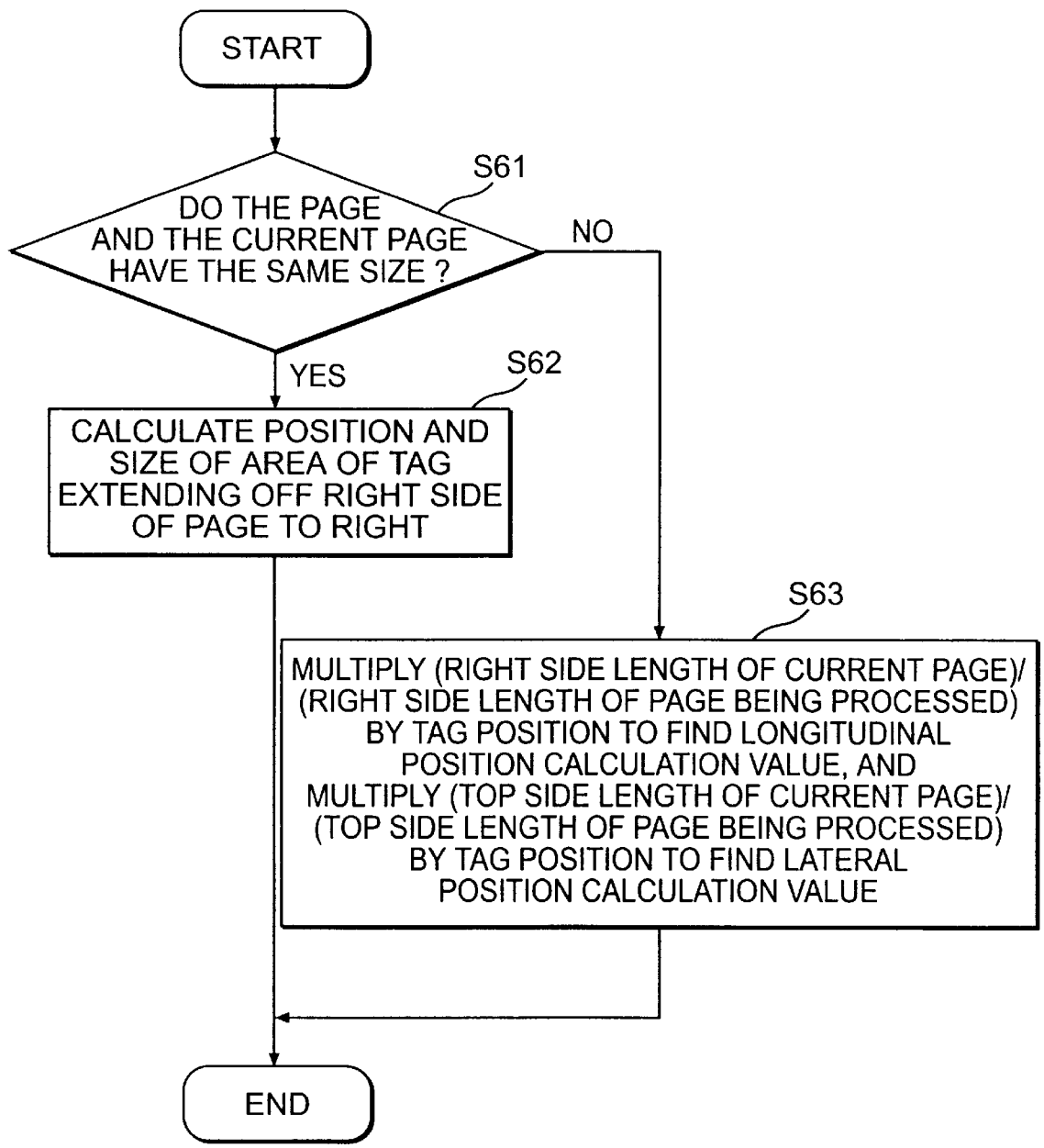
FIG. 12 is a flowchart showing a calculation processing procedure for a tag attached to the right side of a page.
Figure 13:
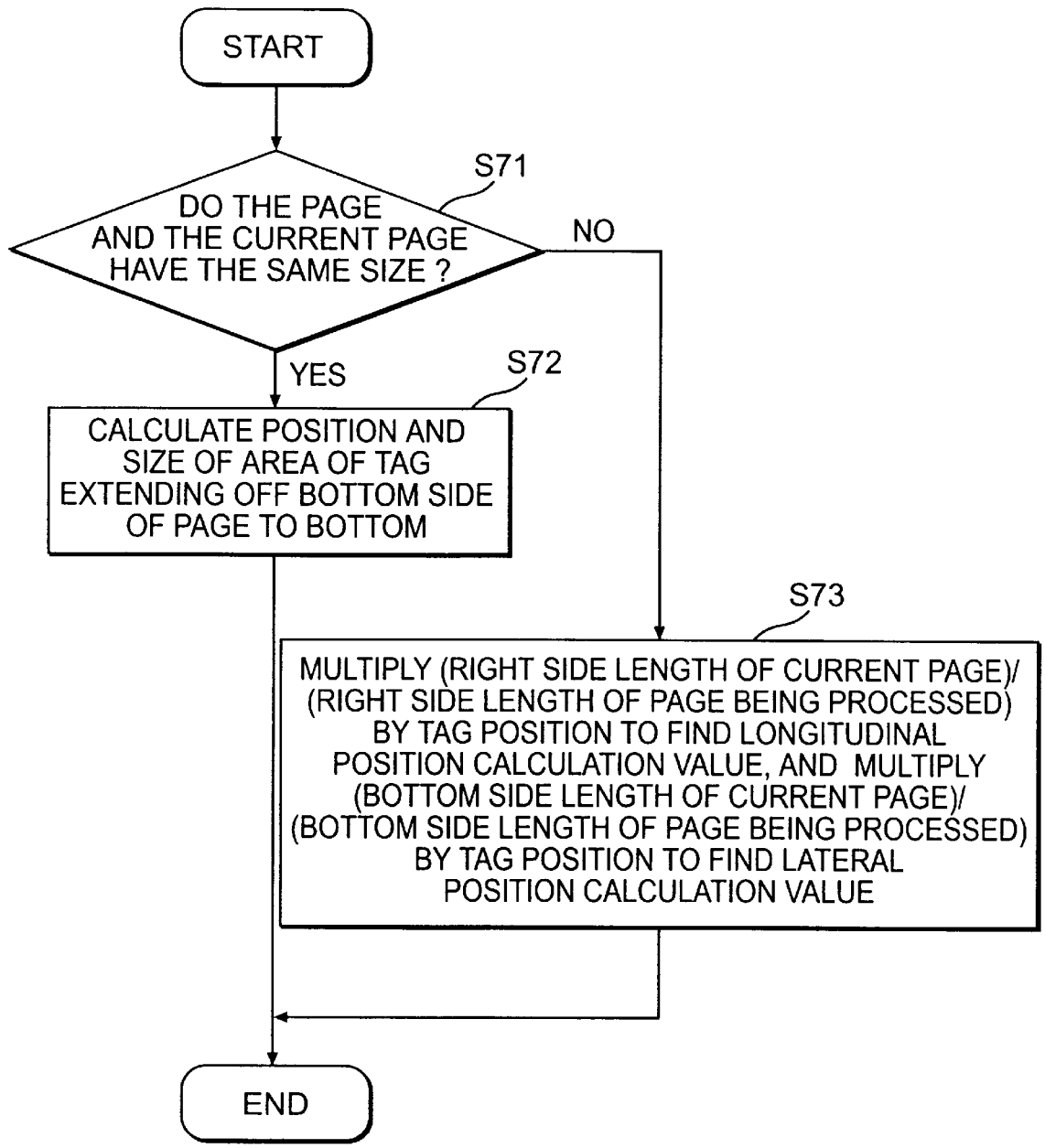
FIG. 13 is a flowchart showing a calculation processing procedure for a tag attached to the bottom side of a page.

On the other hand, if the tag is attached to the top side of the page, a process for the top side shown in FIG. 11 is executed at step S46; if the tag is attached to the right side, a process for the right side shown in FIG. 12 is executed at step S47; and if the tag is attached to the bottom side, a process for the bottom side shown in FIG. 13 is executed at step S48.

In the top side process, the sizes of the current page and the page being processed are obtained from the display data table 4, and are compared with each other at step S51. If the sizes are the same, the position and size of the area of the tag extending off the top side of the page are calculated for use as the overlap area data of the tag at step S52. On the other hand, if the sizes are not the same, the top side length of the current page divided by the top side length of the page being processed is multiplied by the current tag position data to find the attachment position calculation value at step S53, and the calculated position and the current tag size are used as the overlap area data of the tag.

In the right side process, the sizes of the current page and the page being processed are obtained from the display data table 4, and are compared with each other at step S61. If the sizes are the same, the position and size of the area of the tag extending off the right side of the page are calculated for use as the overlap area data of the tag at step S62. On the other hand, if the sizes are not the same, the right side length of the current page divided by the right side length of the page being processed is multiplied by the current tag position data to find the longitudinal attachment position calculation value and the top side length of the current page divided by the top side length of the page being processed is multiplied by the current tag position data to find the lateral attachment position calculation value at step S63, and the calculated positions and the current tag size are used as the overlap area data of the tag.

In the bottom side process, the sizes of the current page and the page being processed are obtained from the display data table 4, and are compared with each other at step S71. If the sizes are the same, the position and size of the area of the tag extending off the bottom side of the page are calculated for use as the overlap area data of the tag at step S72. On the other hand, if the sizes are not the same, the right side length of the current page divided by the right side length of the page being processed is multiplied by the current tag position data to find the longitudinal attachment position calculation value and the bottom side length of the current page divided by the bottom side length of the page being processed is multiplied by the current tag position data to find the lateral attachment position calculation value at step S73, and the calculated positions and the current tag size are used as the overlap area data of the tag.

The data stored in the display data table 4 is changed by the page turning process and the tag display control process associated therewith, and the display control section 3 reads the new data and displays it on the display screen of the data output section 2. This display state will be discussed with reference to FIGS. 14 (*a*) to 16 (*c*).

In FIGS. 14 (*a*) to 17 (*c*), pages are displayed in offset relation for convenience; in fact, the pages are displayed in completely overlapped relation and if no tags exist, they are displayed like a 1-sheet document and cannot be retrieved in page units.

For example, as shown in FIG. 14 (*a*), if a 3-page document is displayed in overlapped relation, when a tag 12 attached to the second page of the document is completely hidden under a tag 11 attached to the first page of the document, the attachment position of the tag 12 is changed upward as shown in FIG. 14 (*b*) by the tag display control processing described above for also displaying the tag 12. If the second page becomes the current page as a result of page turning and both tags 11 and 12 are displayed without changing the attachment position of the tag 12, the tag 12 is restored to the original attachment position for display as shown in FIG. 14 (*c*).

Figure 15A:
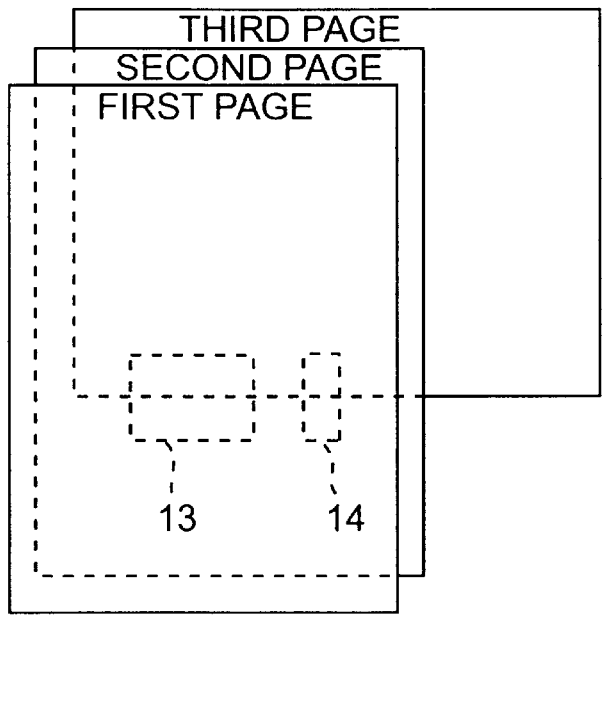
FIGS. 15 (a) to 15 (c) are conceptual diagrams explaining the function when tag attachment positions are changed downward if page sizes differ.
Figure 15B:
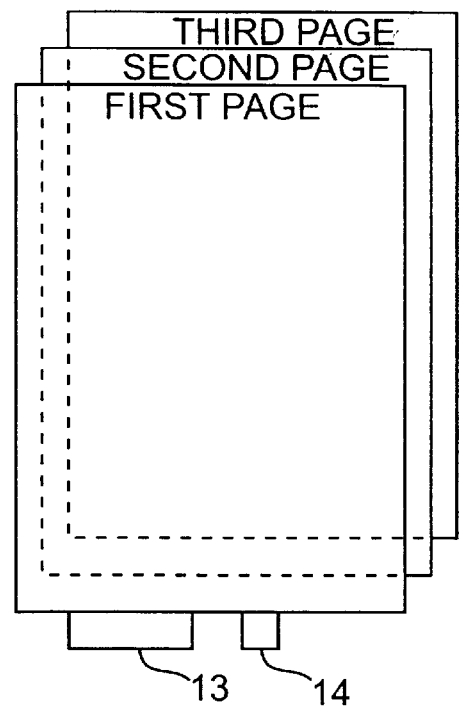
Figure 15C:
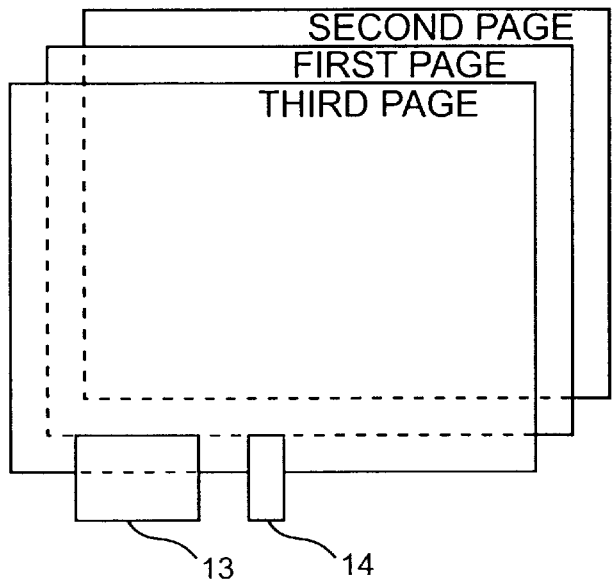

As shown in FIG. 15 (*a*), if documents different in size are mixed for display in overlapped relation, when tags 13 and 14 attached to the third page are completely hidden under the first and second pages themselves, the attachment positions of the tags 13 and 14 are changed downward as shown in FIG. 15 (*b*) by the tag display control processing described above for extending the tags 13 and 14 off the bottom sides of the first and second pages for display. If the third page becomes the current page as a result of page turning and both tags 13 and 14 are displayed without changing the attachment positions of the tags 13 and 14, the tags 13 and 14 are restored to the original attachment positions for display as shown in FIG. 15 (*c*).

Figure 16A:
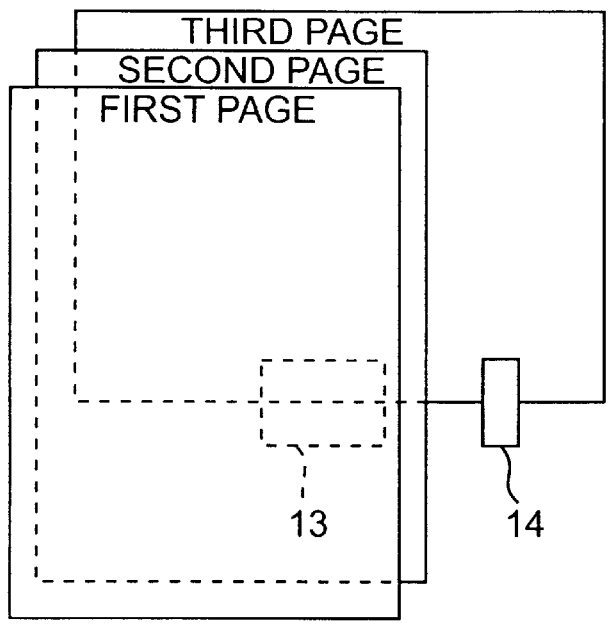
FIGS. 16 (a) to 16 (c) are conceptual diagrams explaining the function when tag attachment positions are changed if page sizes differ.
Figure 16B:
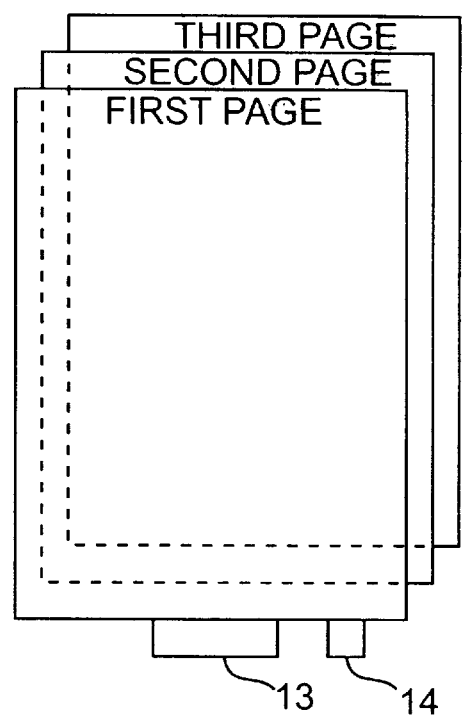
Figure 16C:
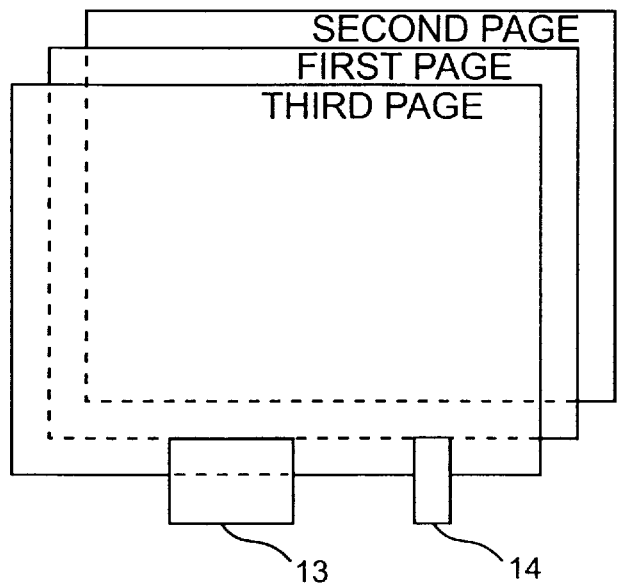

Depending on a change process of tag attachment position data in display control processing, if documents different in size are mixed for display in overlapped relation as shown in FIG. 16 (*a*), the third page can also be set to portrait orientation for matching other pages in size as shown in FIG. 16 (*b*) for extending the attachment positions of tags 13 and 14 off the bottom side as in the landscape orientation, or the first and second pages can be set to landscape orientation for matching the thirds page as shown in FIG. 16 (*c*).

Figure 17A:
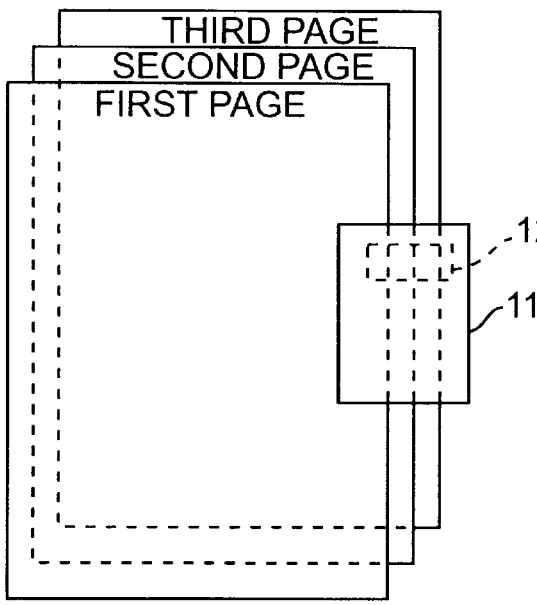
FIGS. 17 (a) to 17 (c) are conceptual diagrams explaining the function when the tag size is changed.
Figure 17B:
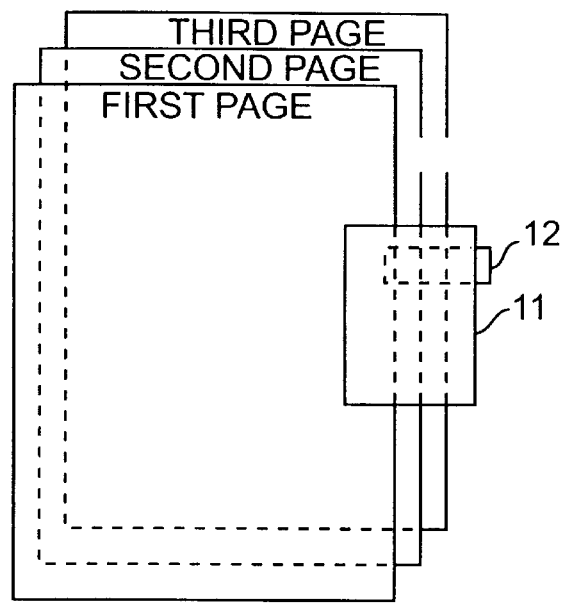
Figure 17C:
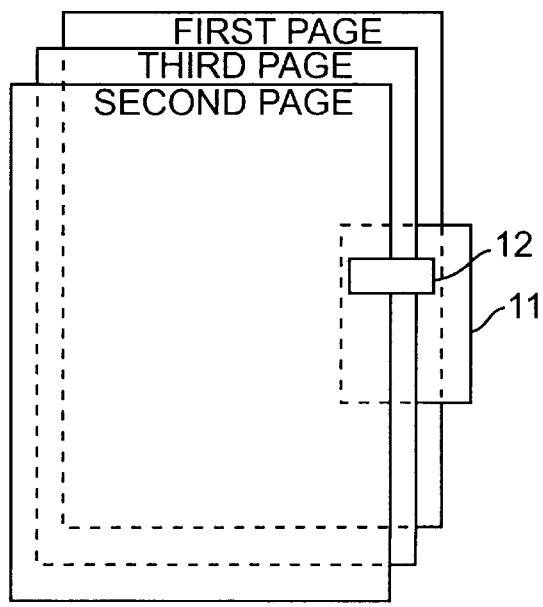

If tag size data is changed in tag display control processing, when the tag 12 attached to the second page is completely hidden under the tag 11 attached to the first page as shown in FIG. 17 (*a*), the size of the tag 12 can be enlarged in a lateral direction for extending the tag 12 off the tag 11 for display as shown in FIG. 17 (*b*). If the second page becomes the current page as a result of page turning and both tags 11 and 12 are displayed without changing the size of the tag 12, the tag 12 is restored to the original size for display as shown in FIG. 17 (*c*).

Figure 18A:
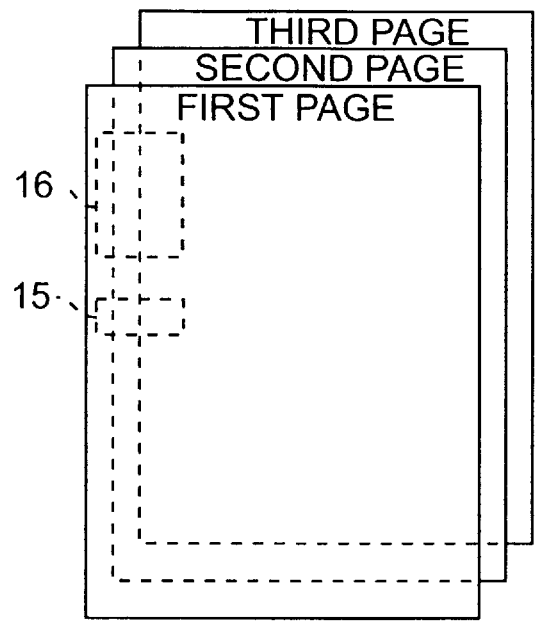
FIGS. 18 (a) to 18 (c) are conceptual diagrams explaining the function when tag attachment positions are changed according to a second embodiment of the invention.
Figure 18B:
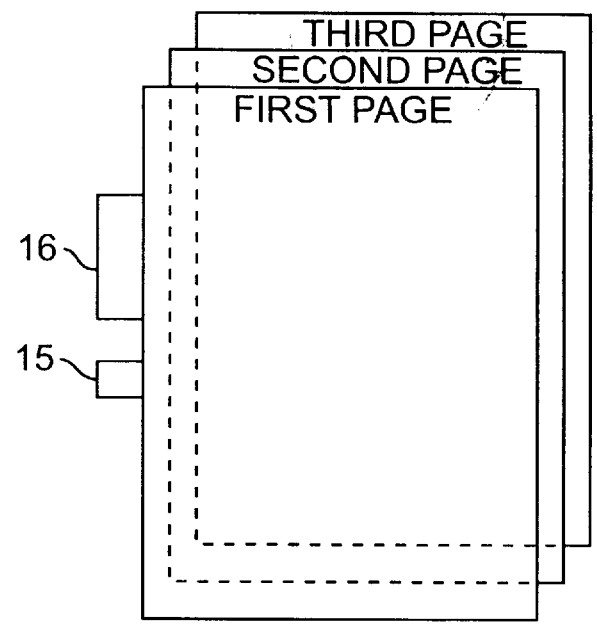
Figure 18C:
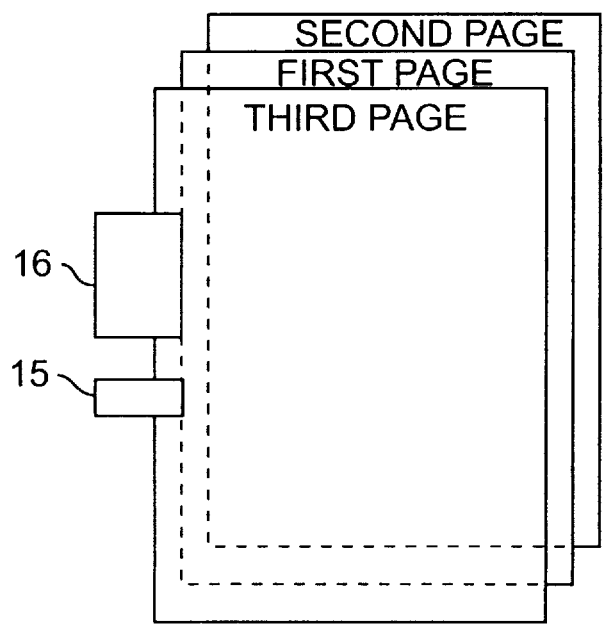

FIGS. 18 (*a*) to 18 (*c*) show a second embodiment of the invention, wherein if pages are displayed in offset overlapped relation in an upper-right direction, etc., when tags 15 and 16 are hidden under an upper page, the attachment positions of the tags 15 and 16 are changed. That is, if the tags 15 and 16 attached to the third page are hidden under the first and second pages as shown in FIG. 18 (*a*), the attachment positions of the tags 15 and 16 are changed to the left for extending the tags 15 and 16 off the left side of the first page as shown in FIG. 18 (*b*). If the third page becomes the current page as a result of page turning and both tags 15 and 16 are displayed without changing the attachment positions of the tags 15 and 16, the tags 15 and 16 are restored to the original attachment positions for display as shown in FIG. 18 (*c*).

Figure 19:
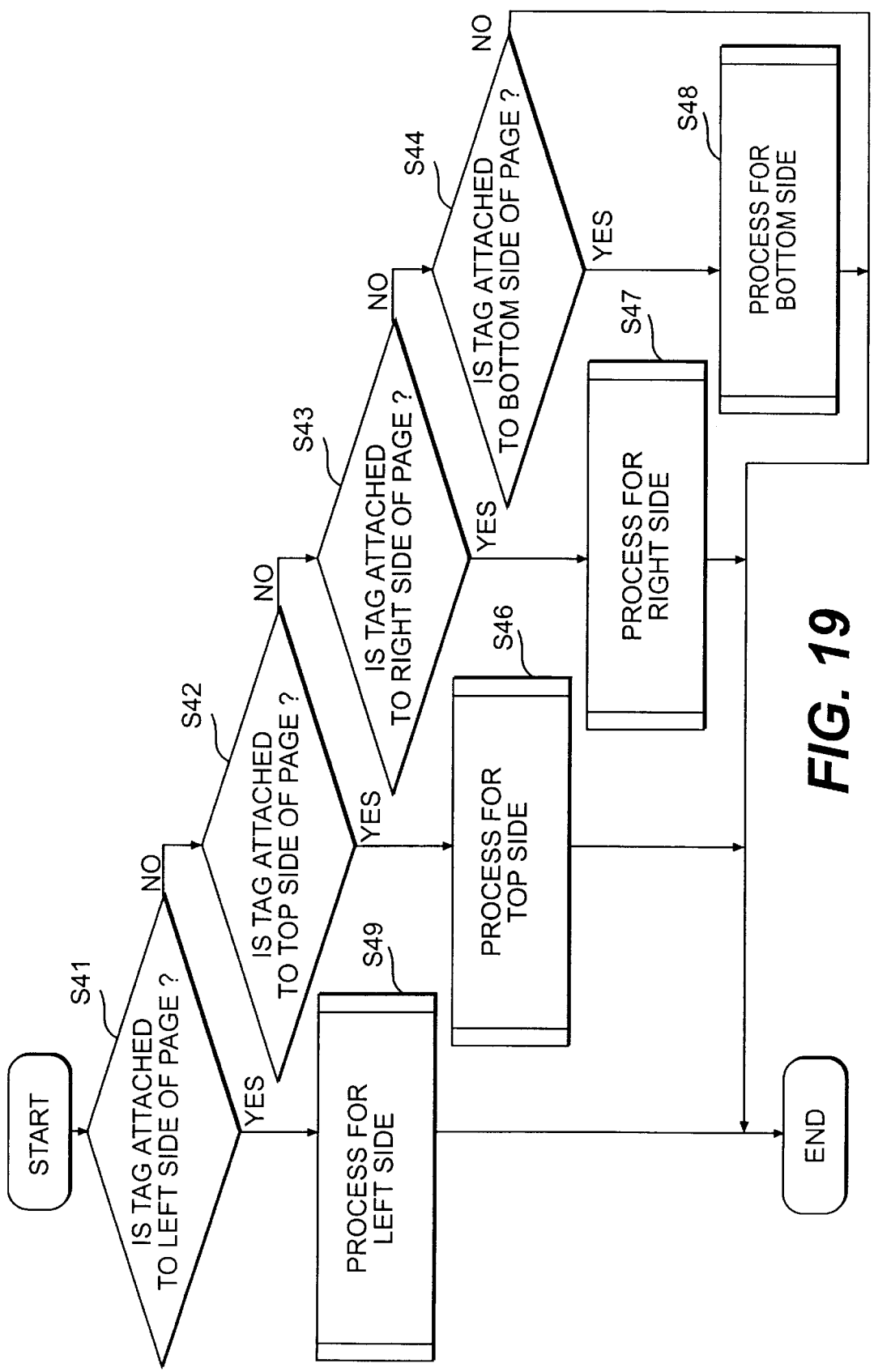
FIG. 19 is a flowchart showing a processing procedure for calculating an overlap area according to the second embodiment of the invention.
Figure 20:
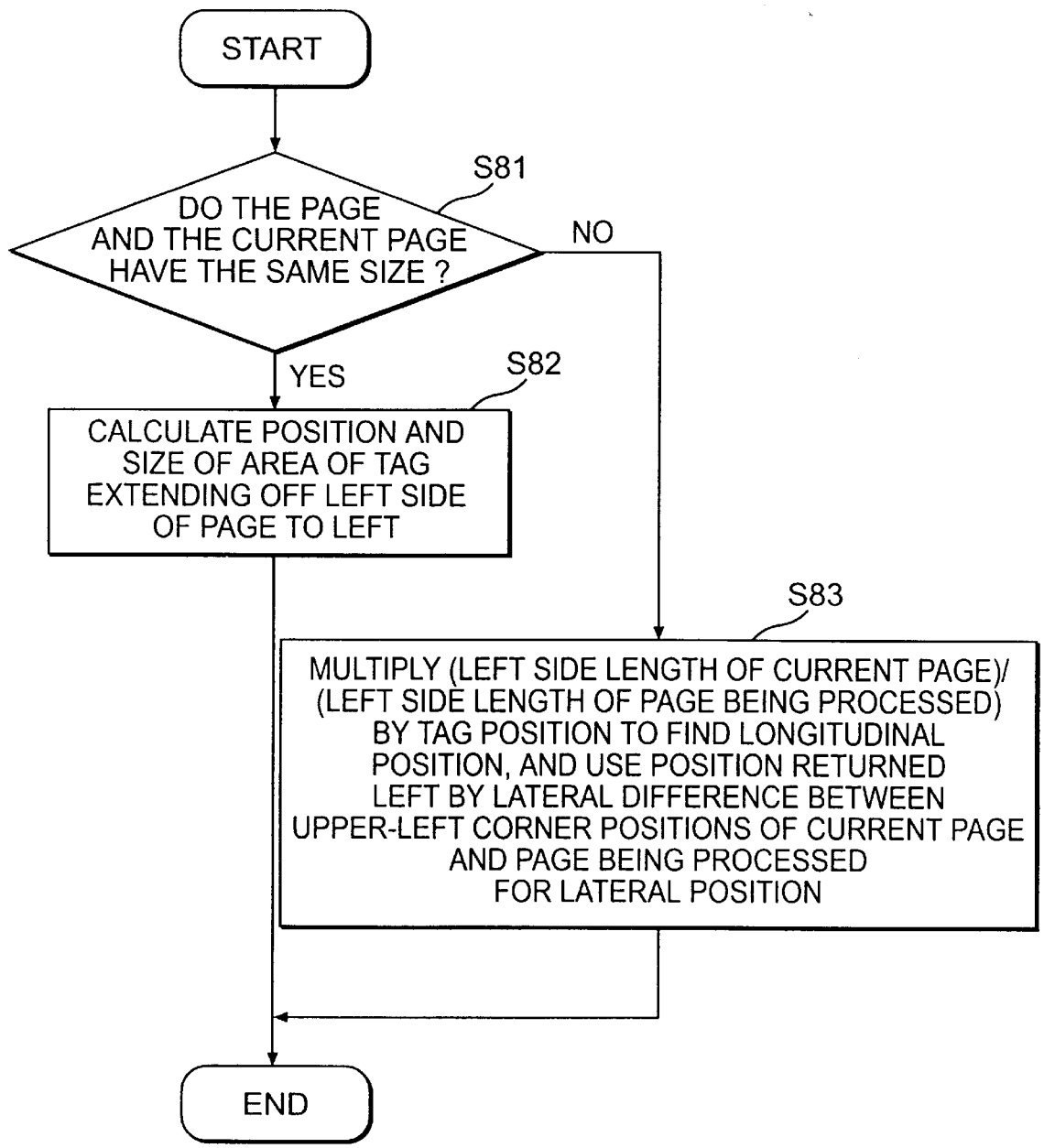
FIG. 20 is a flowchart showing a calculation processing procedure for a tag attached to the left side of a page.

Such tag display control processing is carried out by replacing step S45 shown in FIG. 10 with a process for the left side (step S49) as shown in FIG. 19 and executing a process shown in FIG. 20.

That is, the sizes of the current page and the page being processed are obtained from the display data table 4, and are compared with each other at step S81. If the sizes are the same, the position and size of the area of the tag extending off the left side of the page are calculated for use as the overlap area data of the tag at step S82. On the other hand, if the sizes are not the same, the left side length of the current page divided by the left side length of the page being processed is multiplied by the current tag position data to find the longitudinal attachment position and the lateral attachment position is found by moving the current tag position data left by the difference between the upper-left corner position of the current page and the upper-left corner position of the page being processed at step S83, and the calculated positions and the current tag size are used as the overlap area data of the tag.

FIGS. 21 (a) to 21 (c) show a third embodiment of the invention, wherein if pages are displayed in completely overlapped or offset overlapped relation, when a tag 18 is hidden under a tag 17 larger than the tag 18, the size of the tag 17 is reduced. That is, if the tag 18 attached to the second page is hidden under the tag 17 attached to the first page as shown in FIG. 21 (a), the size of the tag 17 is reduced for extending the tag 18 off the tag 17 for display as shown in FIG. 21 (b). If the second page becomes the current page as a result of page turning and the tag 18 is displayed without changing the size of the tag 17, the tag 17 is restored to the original size for display as shown in FIG. 21 (c).

Figure 9:
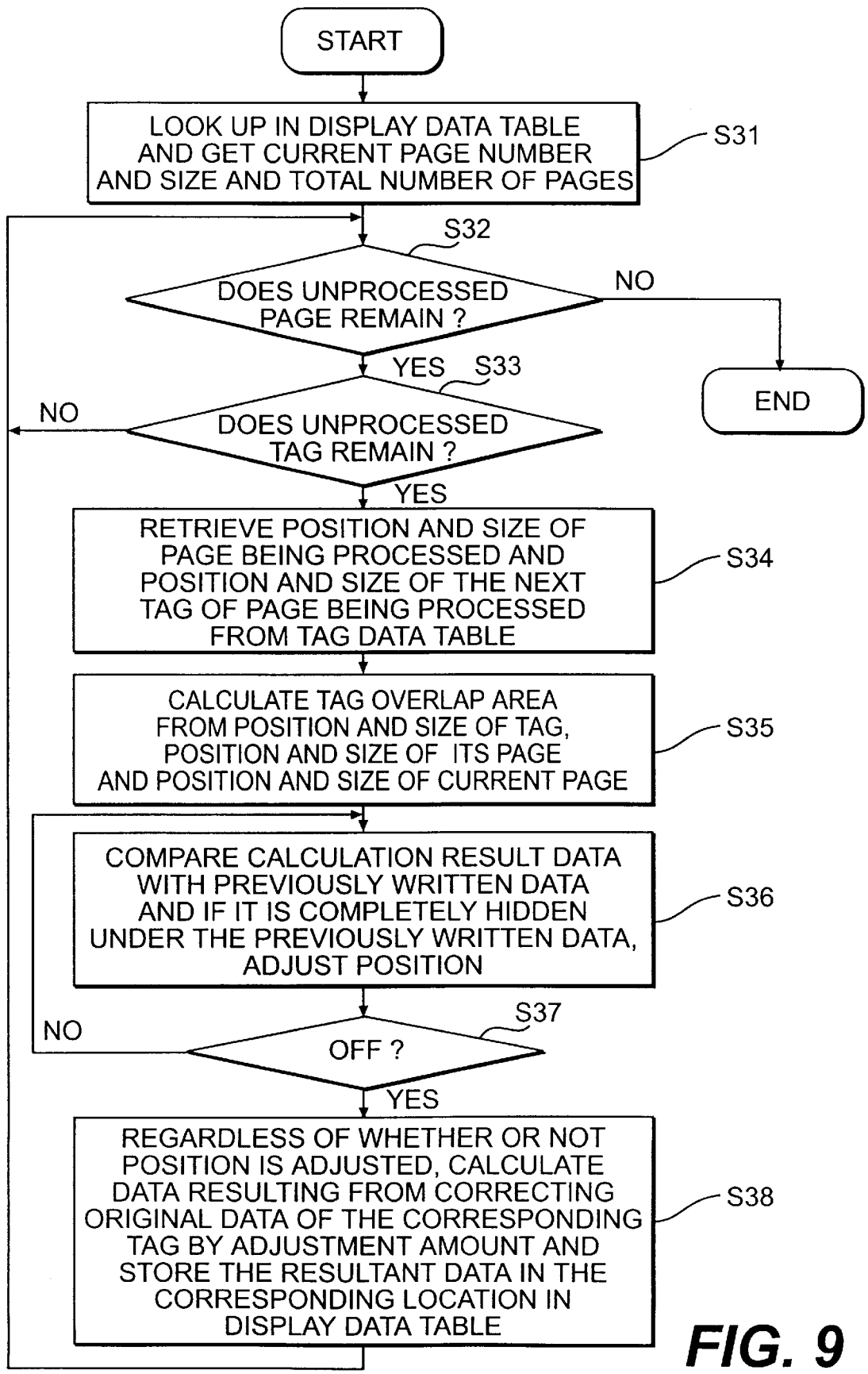
FIG. 9 is a flowchart showing a processing procedure of a tag control section.
Figure 22:
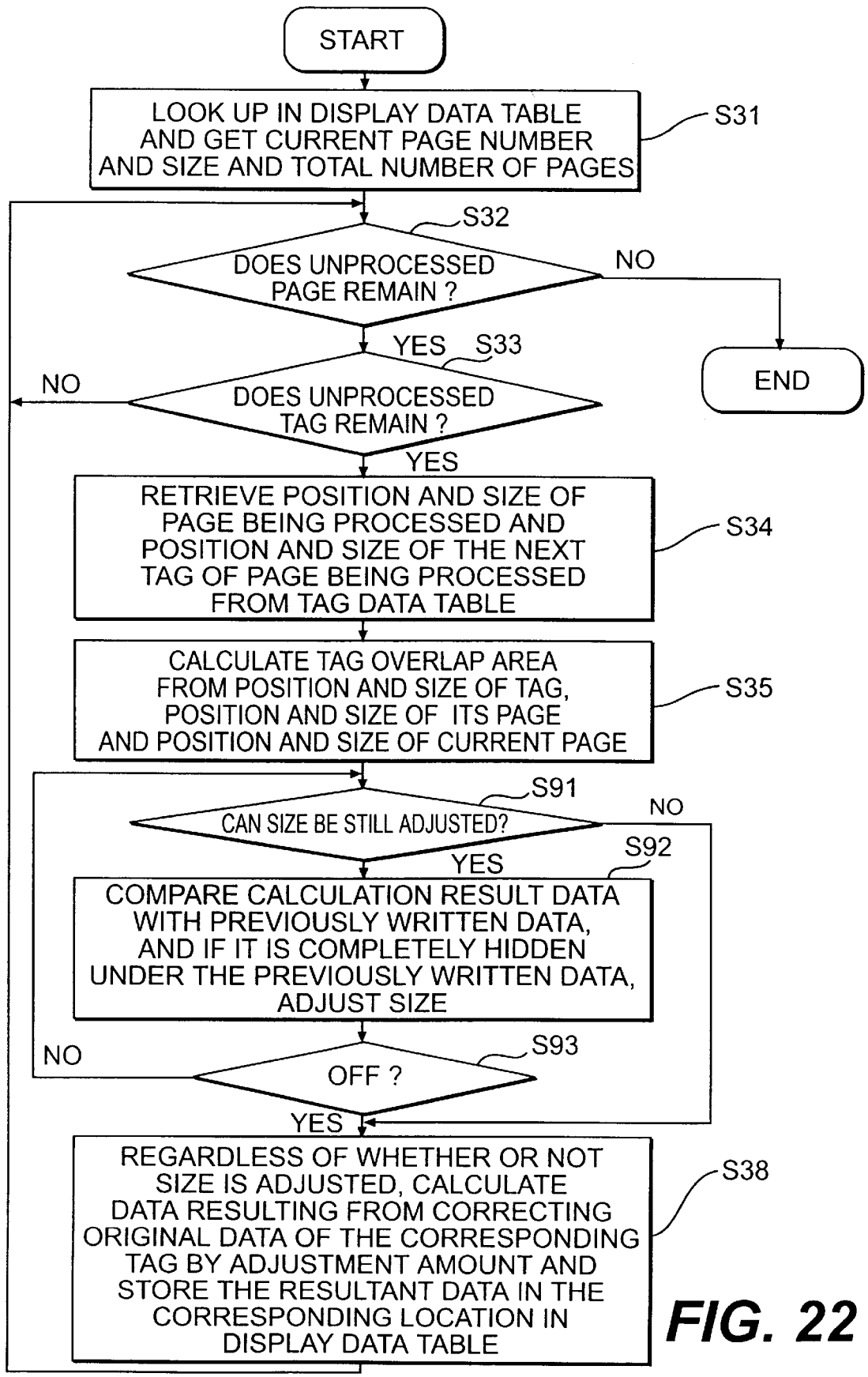
FIG. 22 is a flowchart showing a processing procedure of a tag control section according to the third embodiment of the invention.

Such tag display control processing is carried out by replacing steps S36 and S37 shown in FIG. 9 with steps S91 to S93 as shown in FIG. 22. However, the tags being processed shift in order from the upper tag to lower tag in the processing procedure shown in FIG. 9, while the tags being processed shift in order from the lower tag to upper tag in the processing procedure shown in FIG. 22.

That is, based on the position and size of the tag being processed obtained from the tag data table 8, the overlap area of the tag is calculated and is held in the tag clipping table 9 at step S35. Then, the overlap area data of the tag being processed is compared with the overlap area data of a lower tag previously held in the tag clipping table 9 and if the lower tag is completely hidden under the tag being processed, the size of the upper tag being processed is gradually reduced to adjust the tag position so that at least a part of the lower tag extends off the upper tag at steps S91 to S93.

The new size data of the tag thus processed is rewritten into the corresponding entry of the display data table 4; the tag data stored in the display data table 4 is subjected to size adjustment by the display control processing at step S38.

As discussed above in detail, the tag display control system of the invention can always display tags even if pages are displayed in overlapped relation, and can also always display lower page tags by automatically changing the positions or sizes of tags when pages of documents displayed in overlapped relation are turned, enabling the user to retrieve document pages based on tags without difficulty. The invention is also effective not only for the case where tags overlap each other, but also for the case where pages are displayed in offset overlapped relation or pages different in size are mixed for display in overlapped relation and tags are hidden under an upper page; lower page tags are always displayed for enabling the user to retrieve document pages based on tags without difficulty.

What is claimed is:

1. A tag display control system which displays pages of a document, in which tags are attached to arbitrary end sides of the pages in arbitrary sizes, in a state that adjacent pages are partly overlapped by arranging subsequent pages for a current page at positions sequentially shifted in a predetermined direction, said system comprising:

document information storage means for storing page information including description content information for each page and size information for each page, and tag information including attachment position information for each of the tags attached to arbitrary end sides of the pages and size information for each of the tags attached to each of the pages;

display data generating means for generating display data for displaying the tags attached to a current page and subsequent pages based on information indicating the current page, the page information and the tag information;

display data storage means for storing the display data generated by said display data generating means;

determination means for determining overlap of a tag of a page with respect to another page and a tag thereof based on the display data stored in said display data storage means;

change means for changing the display data of the tag of the page based on a determination result of said determination means and writing the changed tag display data into said display data storage means; and output means for displaying the document and the tags based on the display data stored in said display data storage means.

2. The tag display control system as claimed in claim 1, wherein said determination means and said change means operate based on a page turning instruction entered through input means.

3. The tag display control system as claimed in claim 1, wherein the size information for each of the pages includes a longitudinal and lateral shape, and wherein said output means displays a current page set at an uppermost layer at a shape corresponding to the size information stored in said document information storage means.

4. The tag display control system as claimed in claim 3, wherein said change means changes the position for each of the tags to be displayed based on the determination result of the determination means.

5. The tag display control system as claimed in claim 4, wherein said determination means sequentially determines whether a tag attached to each of the pages is completely hidden under a tag attached to an upper page, and said change means changes the position information for the hidden tag so as to prevent at least part of the hidden tag from being hidden under the tag attached to the upper page.

6. The tag display control system as claimed in claim 5, wherein said change means repeatedly changes the display position for the hidden tag until at least part of the hidden tag is not hidden under the tag attached to the upper page.

7. The tag display control system as claimed in claim 5, wherein said output means displays the current page at the uppermost layer and a page lower than the current page at a size identical to that of the current page, shifted with respect to each other when displaying a document having a plurality of pages different in size from each other.

8. The tag display control system as claimed in claim 7, wherein said display data generating means generates data for displaying a tag of a page at a position corresponding to the shape of the current page based on a ratio between size information of the page and size information of the current page for each page lower than the current page.

9. The tag display control system as claimed in claim 3, wherein said change means changes the size information of a tag.

10. The tag display control system as claimed in claim 3, wherein said determination means sequentially determines whether a tag attached to each of the pages is completely hidden under a tag attached to an upper page, and said change means changes the display size for the hidden tag so as to prevent at least part of the tag from being hidden under the tag attached to the upper page.

11. The tag display control system as claimed in claim 9, wherein said determination means sequentially determines whether a tag attached to each of the pages completely overlaps a tag attached to a lower page, and said change means changes the size information for a tag whose complete overlap has been determined by said determination means so as to prevent at least part of the tag from overlapping the tag attached to the lower page.

12. A tag display control method for displaying a plurality of pages of a document to which tags are attached in overlapped relation in a state that the pages are sequentially shifted in a predetermined direction by using display data storage means for storing tag information including attachment position information and size information for each of the tags attached to arbitrary end sides of the pages, said method comprising the steps of:

determining overlap of a tag of a page with respect to another page and a tag thereof based on the page shape information, the attachment position information, and the size information;

changing the tag information for the tag when the tag overlaps another page or the tag therefore; and displaying the document and the tags based on the tag information stored in the display data storage means.

13. The tag display control method as claimed in claim 12, wherein said changing step changes the attachment position information for the tag.

14. The tag display control method as claimed in claim 12, wherein said changing step changes the size information for the tag.

* * * * *

UNITED STATES PATENT AND TRADEMARK OFFICE
CERTIFICATE OF CORRECTION

| | | |
|---|---|---|
| PATENT NO. | : 6,037,941 | Page 1 of 1 |
| APPLICATION NO. | : 08/634840 | |
| DATED | : March 14, 2000 | |
| INVENTOR(S) | : Tomoyuki Goto | |

It is certified that error appears in the above-identified patent and that said Letters Patent is hereby corrected as shown below:

Claim 5, col. 10, line 41, "position information" should read --display information--.

* Claim 9, col. 10, line 61, "changes" should read --includes means for changing only--.

* Claim 14, col. 12, line 15, "changes" should read --includes changing only--.

Signed and Sealed this

Seventeenth Day of July, 2007

JON W. DUDAS
*Director of the United States Patent and Trademark Office*